United States Patent [19]
Lindberg

[11] Patent Number: 4,568,985
[45] Date of Patent: Feb. 4, 1986

[54] ELECTRONIC CAMERA SCANNING MECHANISM

[75] Inventor: Charles A. Lindberg, Menlo Park, Calif.

[73] Assignee: Datacopy Corporation, Mountain View, Calif.

[21] Appl. No.: 512,258

[22] Filed: Jul. 11, 1983

[51] Int. Cl.[4] .......................... H04N 1/10; H04N 1/04
[52] U.S. Cl. ..................................... 358/293; 358/285; 355/68; 346/139 B
[58] Field of Search ............... 358/293, 294, 285, 256, 358/286; 355/68; 346/139 B

[56] References Cited

U.S. PATENT DOCUMENTS

| | | | |
|---|---|---|---|
| 3,621,135 | 11/1971 | Glencoe et al. | 358/293 |
| 3,662,103 | 5/1972 | Willmer et al. | 358/285 |
| 3,787,889 | 1/1974 | Shaler et al. | 358/293 |
| 3,886,371 | 5/1975 | Lloyd | 358/285 |
| 4,097,904 | 6/1978 | Wada | 358/294 |
| 4,476,496 | 10/1984 | Thaler | 358/286 |

Primary Examiner—James J. Groody
Assistant Examiner—John K. Peng
Attorney, Agent, or Firm—Owen L. Lamb

[57] ABSTRACT

An electronic camera in which a linear array (10), comprised of a row of light-sensitive devices, is mechanically moved in the image plane while being electronically scanned orthogonally to the direction of movement to capture the image. The array (10) is held in the image plane of a lens by a carriage (14) onto which the array is attached. One end of a flexible band (18) is connected to one end (20) of the carriage (14). The flexible band (18) is partially wrapped around a capstan (30) and a turnaround idler wheel (32). The other end of the flexible band (18) is connected to other end (24) of the carriage (14). A motor (34) drives the capstan (30) through a reduction gear to cause the flexible band (18) to move and thereby cause relative motion between the array and the lens.

11 Claims, 4 Drawing Figures

ELECTRONIC CAMERA SCANNING MECHANISM

BACKGROUND OF THE INVENTION

1. Field of the Invention

The invention relates to optical scanning systems, and more particularly, to apparatus for mechanically moving a scanning array in the image plane of an electronic camera.

2. Description of the Prior Art

Apparatus generally referred to as image scanners or electronic cameras have been developed in order to provide a system capable of scanning a document while the scanner or camera is held stationary. Such a camera is disclosed in copending patent application Ser. No. 078,204 of Charles Lindberg et al. titled "Electronic Camera Employing A Solid-state Image Sensor," filed on Sept. 28, 1979 and assigned to the assignee of the present invention, Datacopy Corporation. A ramdom-access controller for such a camera is disclosed in copending patent application Ser. No. 490,746 of Eric Schneider et al. titled "Random Access Electronic," filed on May 2, 1983 and assigned to the assignee of the present invention, Datacopy Corporation.

In order to achieve all of the advantages of a random-access controller, it is desirable to have a camera whose mechanical structure provides tightly limited optical geometry error under allowable shock (impulsive) loads and vibrations of operation. It is also desirable to have a camera in which the array carriage that is moved along the longitudinal axis by a drive mechanism has mechanical structure designed for precise repeatability, high environmental tolerance, and low compliance.

It is a primary object of this invention to provide an improved image scanner which is of such precision as to make it particularly suitable for use as a random-access camera.

SUMMARY OF THE INVENTION

In accordance with one embodiment incorporating the invention, an image scanner is provided which has a focusing lens for focusing the image to be scanned at the image focal plane of the lens. A carriage holds a linear array at the image plane of the lens. The carriage, and thus the array, rides along a guideway parallel to the image plane. The array is thereby precisely guided while being moved in the image plane. One end of a flexible band is connected to one end of the carriage. The flexible band is partially wrapped around a capstan and an idler wheel. The other end of the flexible band is connected to the other end of the carriage through a tensioning spring. A motor drives the capstan to cause the flexible band to move and thereby effect relative motion between the array and the lens. The electronic scanning cycle of the array is initiated at sequential position intervals of the array as the carriage is moved in the image plane. The result is a video output line scan in two dimensions of the image focused at the image focal plane.

The invention has the advantage that it captures images in a very precise manner by providing tightly limited optical geometry error under the maximum allowable shock (impulsive) loads and vibrations of operation and whose array-carriage drive mechanism achieves precise repeatability, high environmental tolerance, and low compliance.

The foregoing and other objects, features, and advantages of the invention will be apparent from the following, more particular description of preferred embodiments of the invention as illustrated in the accompanying drawings.

DESCRIPTION

Only the camera itself is disclosed herein. The camera mechanism may be supported above a document to be scanned by a stand, as shown in the above-identified Lindberg, et al. patent application Ser. No. 078,204. The camera may be used in either the system disclosed in the Lindberg, et al. patent application Ser. No. 078,204, or the system disclosed in the above-identified Schneider et al. patent application Ser. No. 490,746.

Figure 1:
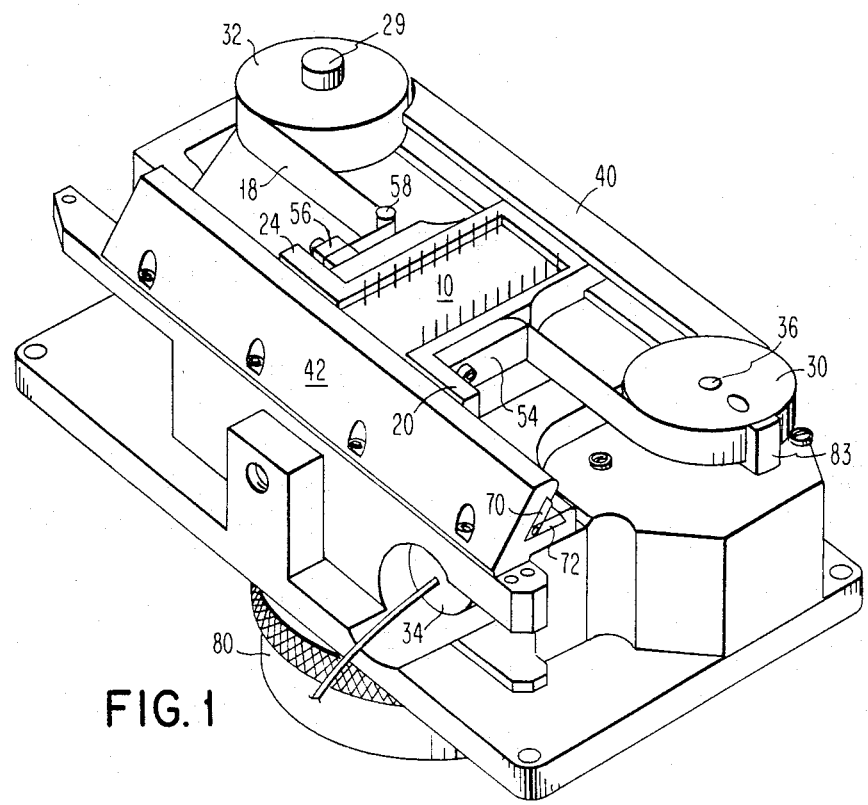
FIG. 1 is a perspective view from the rear, right bottom corner of an electronic camera constructed in accordance with the principles of the present invention.
Figure 2:
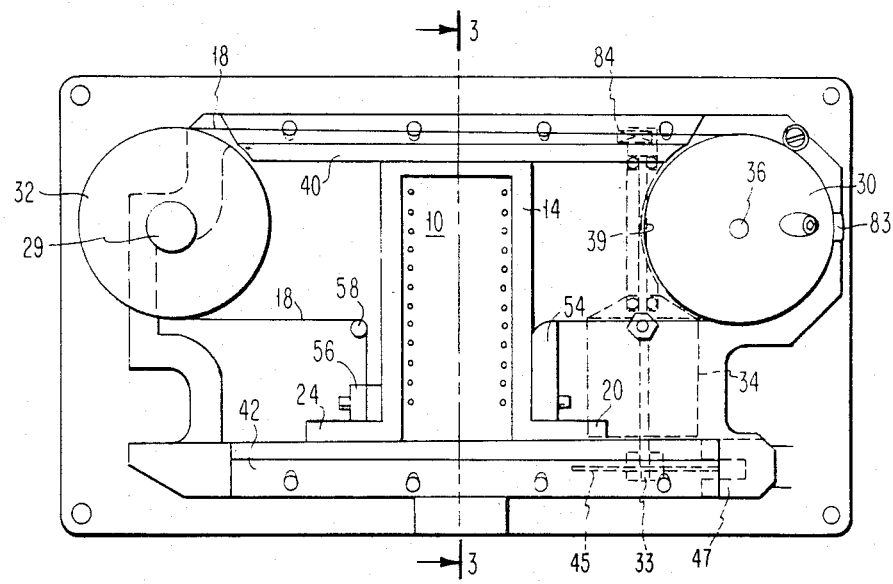
FIG. 2 is a top view of the camera shown in FIG. 1.
Figure 3:
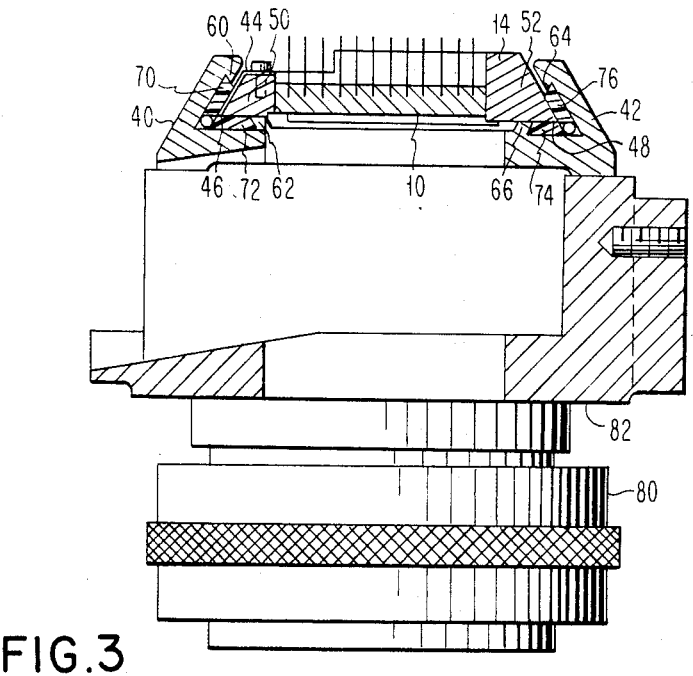
FIG. 3 is a side sectional view of the camera shown in FIG. 1, taken along section lines 3—3 shown in FIG. 2; and, FIG. 4 is a perspective detail of the motor, shaft encoder, drive gearing and capstan mechanism of the camera shown in FIG. 1, oriented as if seen from approximately the same angle of view as FIG. 1.
Figure 4:
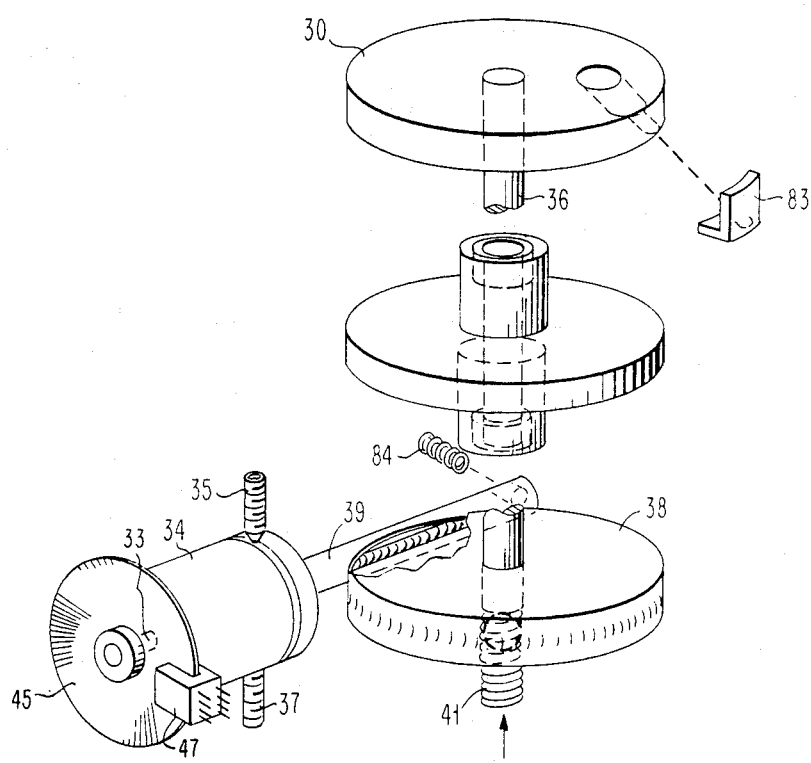

Referring to FIGS. 1-3, a scanning array (10) is mounted on a carriage (14). The carriage is mounted in a slider frame (40, 42). The carriage (14) is forced into a zero clearance fit with the slider frame by means of a spring (44). The spring force on the carriage (14) is designed to provide tightly limited optical geometry error under the maximum allowable shock (impulsive) loads and vibrations of operation. The carriage is pulled along the longitudinal axis by a belt drive mechanism (18, 30, 32) designed for repeatability, high environmental tolerance, and low compliance.

The drive capstan (30) is mounted on a support shaft (36) with a worm gear (38) made of, for example, an acetal copolymer. The worm gear (38) is manufactured with an 0-80 screw thread and driven with an 0-80 threaded drive shaft (39) by a motor (34). The drive shaft (39) is an extension of the motor's armature shaft (36). This arrangement provides an effective 280:1 gear reduction from motor to array drive through the capstan (30).

The motor armature shaft (33) carries an optical encoder disk (45), which interfaces with an optical sensor (47). The optical encoder disk and optical sensor together provide signals representing motor shaft position and, therefore, array position. As more fully described in the above-referenced Schneider, et al. patent application Ser. No. 490,746, these signals are used by a servo as the feedback element for velocity estimation.

The carriage (14) is driven back and forth in the horizontal direction in the slider frame (40, 42) by means of the motor (34) which turns capstan (30) which drives the belt (18).

Attached to the carriage (14) is an image sensor array (10). The image sensor is comprised of an array of light-sensitive devices, such as, but not limited to, one or more rows of photodiodes.

The carriage (14) in FIGS. 1-3 is shown at its mid-position in the line of travel of the carriage. The optical surface of the image sensor (10) is parallel to and in the image plane of the lens (80). As the carriage (14) moves throughout the length of its travel along the slider frame (40, 42), the image sensor (10) travels horizontally in the image plane of the lens.

The slider frame is constructed as follows. A first guideway (46) is provided having a horizontal half-dovetail sliding surface. A second guideway (48) is provided having a horizontal half-dovetail sliding surface. Each slider frame guideway may be constructed in one piece, or as in the preferred embodiment shown, constructed of several pieces made of different materials. The slider frame (40, 42) is affixed to the camera body. The carriage (14) has a horizontal half-dovetail tongue (50) on a first side thereof, the tongue (50) being adapted to engage the horizontal half-dovetail sliding surface of the first guideway (46) of the slider frame (40). The carriage has a second horizontal half-dovetail tongue (52) on a second side thereof, the second tongue (52) being adapted to engage the second horizontal sliding surface of the second guideway (48) of the slider frame (42). A spring (44) affixed to the tongue (50) holds the carriage in place, while allowing free movement therof along the slider frame.

A first portion of the flexible band (18) is wrapped around capstan (30) in engagement therewith. A second portion of the flexible band (18) is wrapped around a turnaround idler wheel (32) in engagement therewith. A clamp (54) connects the first end of the flexible band to the carriage (14). Another clamp (56) connects the second end of the flexible band (18) to the carriage (14), along with a band-tensioning leaf spring (58). The motor (34) drives the capstan (30) to cause the flexible band (18) to move and thereby effect motion of the carriage with respect to the slider frame (40, 42). The flexible band (18) is held in place against tendency to creep on capstan (30) by means of a clamp (83).

The slider frame is constructed as follows. The slider frame (40, 42) has cavities cut on inner sides thereof for receiving plastic slide ways (70, 72, 74, 76). The cavities have lips (60, 62, 64, 66) on each inner edge of said cavity for restraining the plastic ways.

The plastic ways which provide upper and lower sliding surfaces, are manufactured to fit in the cavities. The thickness of the plastic is such that some plastic can be machined off after the parts are assembled. The plastic ways may be glued in place, and/or locked in the cavities by inserting retaining means in the cavity, the retaining means being adapted to coact with the ways and the cavities so as to urge the ways into a restraining relationship with the lips. The retaining means may be, for example, a resilient rod, such as rubber, wedged in the cavity behind the ways. The resilient rod may be held in place by a nonresilient rod, such as metal, wedged in the cavity so as to take up any slack. The slider frame guideways with the plastic ways in place are attached to the camera body.

METHOD OF MANUFACTURE

A method of manufacturing the above-described camera is as follows. Metal stock is extruded to provide a slider frame (40, 42) with cavities cut on inner sides thereof, said cavities having lips (60, 62, 64, 66) on each inner edge of said cavity for receiving and restraining plastic slide ways (70, 72, 74, 76).

The plastic ways which provide upper and lower sliding surfaces, are extruded such that they are adapted to fit in the cavities. The thickness of the plastic is made so that some plastic can be machined off after the parts are assembled. The ways are locked in the cavities by inserting retaining means in the cavity, the retaining means being adapted to coact with the ways and the cavities so as to urge the ways into a restraining relationship with the lips. The retaining means may be, for example, a resilient rod, such as rubber, wedged in the cavity behind the ways. The resilient rod may be held in place by a nonresilient rod, such as metal, wedged in the cavity so as to take up any slack. The slider frame guideways with the plastic ways in place are attached to the camera body. Finally, the the ways are machined parallel to the lens mounting surface (82).

It should be understood that the slider frame and camera body can be combined into one part, and formed by die casting techniques. The extruded sider cavities can be formed by a broaching operation, since an undercut to form the cavities is difficult to die cast. Alternatively, this one part can be made as a glass-filled plastic molding, thus eliminating the need for assembling plastic ways. The side ways on the molded part if cast over size, can be machined as described above.

While the invention has been particularly shown and described with reference to preferred embodiments thereof, it will be understood by those skilled in the art that the foregoing and other changes in form and detail may be made therein without departing from the spirit and scope of the invention.

What is claimed is:

1. In a scanner comprising a focusing lens for focusing, at the image focal plane of said lens, the image of an object to be scanned;
   an array of the type in which a row of light-sensitive devices is scanned to provide a train of output pulses proportional in magnitude to the light intensity falling upon each successively scanned light-sensitive device; and
   means for holding said array in the image plane of said lens, said means including carriage means for allowing movement between said array and said lens such that relative motion between said array and said lens is allowed,
   the improvement characterized by:
   a capstan;
   an idler wheel;
   a flexible band;
   said flexible band being wrapped around said capstan in engagement therewith, and wrapped around said idler wheel in engagement therewith;
   means for connecting said flexible band to said carriage;
   said means for holding said array comprising
      first and second slider frame guideways positioned parallel to said image plane of said lens;
      said carriage being adapted to engage said first and second slider frame guideways such that said carriage is free to move along said guideways in a plane which is parallel to said image plane of said lens;
   means for securing said array to said carriage, and,
   driving means coupled to said capstan for driving said capstan to cause said flexible band to move.

2. The combination in accordance with claim 1 wherein said means for connecting said flexible band to said carriage includes a tensioning spring.

3. The combination in accordance with claim 1 wherein:
   said first slider frame guideway has a first horizontal sliding surface cut therein;

said second slider frame guideway has a second horizontal sliding surface cut therein;

said carriage has a first horizontal tongue on a first side thereof, said first horizontal tongue being adapted to engage said first horizontal sliding surface; and, said carriage has a second horizontal tongue on a second side thereof, said second horizontal tongue being adapted to engage said second horizontal sliding surface.

4. In a scanner comprising a focusing lens for focusing, at the image focal plane of said lens, the image of an object to be scanned;

a linear array of the type in which a row of light-sensitive devices is scanned to provide a train of output pulses proportional in magnitude to the light intensity falling upon each successively scanned light-sensitive device; and means for holding said array in the image plane of said lens, said means including means for allowing movement between said array and said lens such that relative motion between said array and said lens is allowed, said means for holding said array being characterized by:

a first slider frame guideway having a first horizontal sliding surface cut therein;

a second slider frame guideway having a second horizontal sliding surface cut therein;

said first and second slider frame guideways being held in a fixed relationship with respect to said lens;

a carriage;

said carriage having a first horizontal tongue on a first side thereof, said first horizontal tongue being adapted to engage said first horizontal sliding surface;

said carriage having a second horizontal tongue on a second side thereof, said second horizontal tongue being adapted to engage said second horizontal sliding surface; and, means for securing said array to said carriage.

5. The combination in accordance with claim 4 further comprising:

a capstan;

an idler wheel;

a flexible band having a first end, a second end, first and second portions between said first and second ends, and a middle portion between said first and second portions;

said first portion of said flexible band being wrapped around said capstan in engagement therewith, and said second portion of said flexible band being wrapped around said idler wheel in engagement therewith;

first means for connecting said first end of said flexible band to said carriage;

second means for connecting said second end of said flexible band to said carriage; and, driving means coupled to said capstan for driving said capstan to cause said flexible band to move and thereby cause motion of said carriage with respect to said first and second slider frame guideways.

6. The combination in accordance with claim 5 wherein said means for connecting said flexible band to said carriage includes a tensioning spring.

7. A camera mechanism comprising;

a camera body;

a first slider frame guideway having a first horizontal sliding surface cut therein;

a second slider frame guideway having a second horizontal sliding surface cut therein;

said first and second slider frame guidways being affixed to said camera body;

a carriage;

said carriage having a first horizontal tongue on a first side thereof, said first horizontal tongue being adapted to engage said first horizontal sliding surface;

said carriage having a second horizontal tongue on a second side thereof, said second horizontal tongue being adapted to engage said second horizontal sliding surface;

a capstan;

an idler wheel;

a flexible band having a first end, a second end, first and second portions between said first and second ends, and a middle portion between said first and second portions;

said first portion of said flexible band being wrapped around said capstan in engagement therewith, and said second portion of said flexible band being wrapped around said idler wheel in engagement therewith;

first means for connecting said first end of said flexible band to said carriage;

second means for connecting said second end of said flexible band to said carriage; and, driving means coupled to said capstan for driving said capstan to cause said flexible band to move and thereby cause motion of said carriage with respect to said first and second slider frame guideways.

8. The combination in accordance with claim 7 wherein said means for connecting said flexible band to said carriage includes a tensioning spring.

9. The combination in accordance with claim 3, claim 4, or claim 7 wherein said first slider frame guideway further comprises:

a cavity having an upper inner wall and a lower inner wall; and, means for affixing a sliding surface material to said lower and upper walls of said cavity.

10. In a scanner comprising a focusing lens for focusing, at the image focal plane of said lens, the image of an object to be scanned;

an array of the type in which a row of light-sensitive devices is scanned to provide a train of output pulses proportional in magnitude to the light intensity falling upon each successively scanned light-sensitive device;

the improvement characterized by:

means for holding said array in the image plane of said lens, said holding means including a first slider frame guideway having a first horizontal sliding surface cut therein and a second slider frame guideway having a second horizontal sliding surface cut therein;

said first and second slider frame guideways being held in a fixed relationship with respect to said image plane of said lens;

carriage means for allowing movement between said array and said lens, said carriage means having a first horizontal tongue on a first side thereof, said first horizontal tongue being adapted to engage said first horizontal sliding surface;

said carriage having a second horizontal tongue on a second side thereof, said second horizontal tongue being adapted to engage said second horizontal sliding surface; and, means for securing said array to said carriage; and, means for moving said carriage.

11. The combination in accordance with claim 10 wherein said means for moving said carriage comprises:
 a capstan;
 an idler wheel;
 a flexible band having a first end, a second end, first and second portions between said first and second ends, and a middle portion between said first and second portions;

said first portion of said flexible band being wrapped around said capstan in engagement therewith, and said second portion of said flexible band being wrapped around said idler wheel in engagement therewith;

first means for connecting said first end of said flexible band to said carriage;

second means for connecting said second end of said flexible band to said carriage; and, driving means coupled to said capstan for driving said capstan to cause said flexible band to move.

* * * * *